United States Patent [19]

Priefert

[11] 4,023,693
[45] May 17, 1977

[54] APPARATUS FOR HANDLING A LARGE HAY BALE

[75] Inventor: William D. Priefert, Mount Pleasant, Tex.

[73] Assignee: Priefert Mfg. Co., Inc., Mount Pleasant, Tex.

[22] Filed: Feb. 6, 1976

[21] Appl. No.: 656,025

[52] U.S. Cl. .............................. 214/354; 214/766; 214/DIG. 4
[51] Int. Cl.² .......................................... B60P 1/04
[58] Field of Search .......... 214/354, 353, 352, 350, 214/390, 501, 766, DIG. 4, 144

[56] References Cited

UNITED STATES PATENTS

2,468,297 4/1949 Jones .................................. 214/352
3,949,706 4/1976 Coon, Jr. ....................... 214/390 X

Primary Examiner—Albert J. Makay
Attorney, Agent, or Firm—Rudolph L. Lowell

[57] ABSTRACT

The apparatus of this invention is capable of handling large bales of hay weighing fifteen hundred pounds or more without requiring the use of hydraulic, electrical or any other special source of power. The apparatus includes a portable frame connectable to a tractor and a hay buck or fork unit carried on a lift frame assembly which is movably supported on the portable frame to provide for a movement of the fork unit between a lowered bale loading position and a bale transport position. The fork unit is movable by gravity from the transport position to the bale loading position therefor, wherein the bale is loaded by a rearward movement of the portable frame relative to such bale. As the bale approaches a fully carried position on the fork unit, a leverage means is automatically actuated to elevate the lift frame assembly to a transport position in response to a forward advance of the portable frame. When the fork unit reaches the transport position the lift frame assembly is automatically locked against movement to a bale loading position for the fork unit.

9 Claims, 28 Drawing Figures

Figure 19:
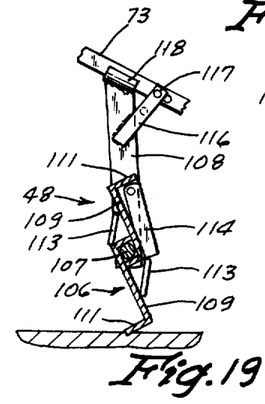
FIG. 19 is a detail sectional view illustrated similarly to FIG. 16 showing a supporting lever arm for the rotary foot unit in a position corresponding to the foot position of FIG. 18.

Fig. 19   Fig. 20 ns and a preferred embodiment of the apparatus is illustrated in FIGS. 7-25, inclusive.

APPARATUS FOR HANDLING A LARGE HAY BALE

SUMMARY OF THE INVENTION

The apparatus is of a compact and rugged construction efficient in operation to load, transport and unload a heavy package or container in response to the rearward and forward movements of the towing or tractor vehicle. The apparatus has a load receiving or fork unit carried on a lift frame assembly which is mounted on a portable frame for movement to a first position wherein the fork unit is in a lowered loading position and to a second position wherein the fork unit is in an elevated or transport position. A bale is loaded in the fork unit on a rearward movement of the apparatus relative to the bale. With the bale fully supported on the fork unit, a leverage lift system is automatically actuated so that on a forward advance of the apparatus, the fork unit is automatically elevated to and then maintained in its transport position. When the bale is to be unloaded, it is only necessary to manually release the fork unit to its loading position; advance the apparatus to unload the bale from the fork unit; and then manually actuate the leverage lift system to move and maintain the empty fork unit in its transport position for return of the apparatus to the field to load another bale.

BRIEF DESCRIPTION OF THE DRAWINGS

FIG. 20 is illustrated similarly to FIG. 19 and shows a supporting lever arm of the rotary foot unit in an advanced rotated position relative to its showing in FIG. 19 and wherein the rotary foot is released for free rotation in opposite directions;

DETAILED DESCRIPTION OF THE INVENTION

The bale handling apparatus of this invention is capable of loading, transporting and unloading large hay bales, packages or containers in response to the forward and reverse travel movements of a towing vehicle without requiring the use of a hydraulic, electrical or other special source of power. Thus referring to FIGS. 1-6, inclusive, the apparatus is diagrammatically illustrated in positions showing various bale handling operations. Generally, the apparatus is comprised of a portable frame 40 that is equipped with rear ground wheels 41 and a forward tongue structure 42 connectible to a towing vehicle, such as a tractor or pickup truck 43. A lift frame assembly or carriage 44 is movably supported on the portable frame 40 and carries a fork unit or hay buck 46 for movement from a ground engaged bale loading position to an elevated bale transport position. Movement of the fork unit from the transport to the loading position takes place by the action of gravity. The fork unit is moved from the loading position to the transport position by a leverage lift system which includes a lift lever means 47 and a coacting ground engaging lever structure 48.

Figure 1:
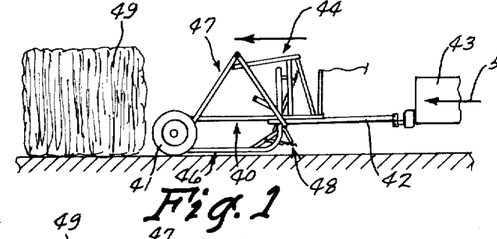
FIG. 1 is a diagrammatic illustration showing the apparatus of this invention with the fork unit in a lowered position to load a bale.
Figure 2:
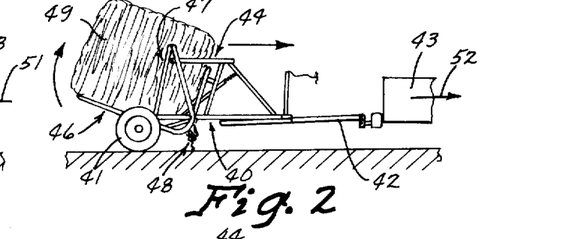
FIG. 2 diagrammatically illustrates the loaded fork unit approaching the transport position therefor.

In FIG. 1, the fork unit 46 is shown in a bale loading position with the ground engaging lever structure 48 releasably held in a ground clearance relation. The bale 49 to be handled is loaded by moving the fork unit 46 thereunder by operating the tractor 43 in a reverse direction as indicated by the arrows 51. When the bale is loaded the ground engaging lever structure 48 is automatically released into ground engagement (FIG. 2) so that on a forward advance of the tractor vehicle 43, as shown by the arrows 52, the fork unit is elevated to its transport position (FIG. 3) and the ground engaging lever structure 48 is automatically engaged and held in a ground clearance relation.

Figure 4:
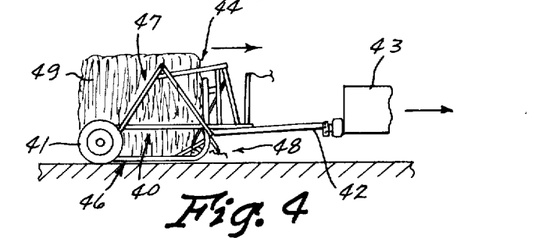
FIG. 4 illustrates diagrammatically the fork unit in the lowered position therefore prior to unloading a bale.
Figure 5:
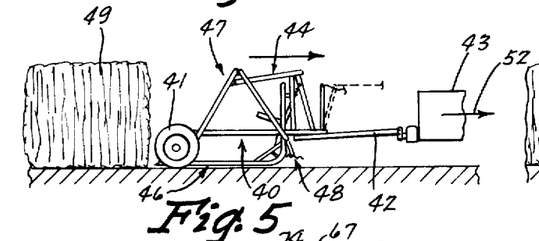
FIG. 5 is illustrated similarly to FIG. 4 but with the apparatus advanced forwardly to unload a bale from the fork unit.

On transport of the bale 49 to a feeding or storage station to be unloaded, the lift frame assembly 44 is released from a locked transport position and the fork unit 46 lowered to the unloading position of FIG. 4 by the action of gravity. It is to be noted that the unloading position of the apparatus in FIG. 4 is the same in all respects as the loading position therefor in FIG. 1. With the fork unit 46 in the unloading position therefor, the tractor vehicle 43 is advanced to move the fork unit forwardly from underneath the bale 49 as shown in FIG. 5 wherein the parts of the apparatus are arranged in all respects similar to their arrangement in FIGS. 1 and 4.

Figure 3:
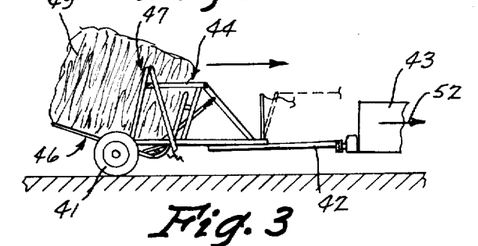
FIG. 3 is a diagrammatic illustration showing the fork unit in transport position with a bale thereon.
Figure 6:
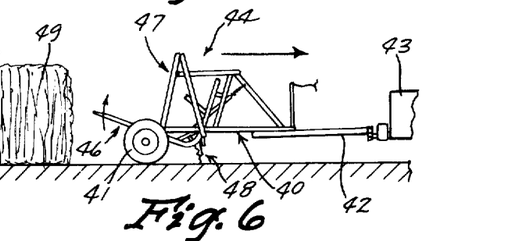
FIG. 6 is illustrated similarly to FIG. 2 and shows the empty or unloaded fork unit approaching its transport position.

To elevate the empty fork unit 46 to the transport position therefor, the ground engaging lever structure 48 is manually actuated into ground engaging position, as shown in FIG. 6, and in response to a forward advance of the tractor 43 the fork unit 46 is elevated to its transport position; the lift frame assembly 44 is locked in the transport position and the ground engaging lever structure is moved into and held in a ground clearance relation in all ways similar to such operation as described in connection with FIG. 3.

The portable frame 40 (FIGS. 7 and 8) is of a U-shape having a forward transverse base section 53 and rearwardly extended legs or side members 54 which terminate in downwardly projected sections 56. Each terminal section 56 rotatably supports a ground wheel 41 and the tongue structure 42 is secured to the base section 53.

Figure 7:
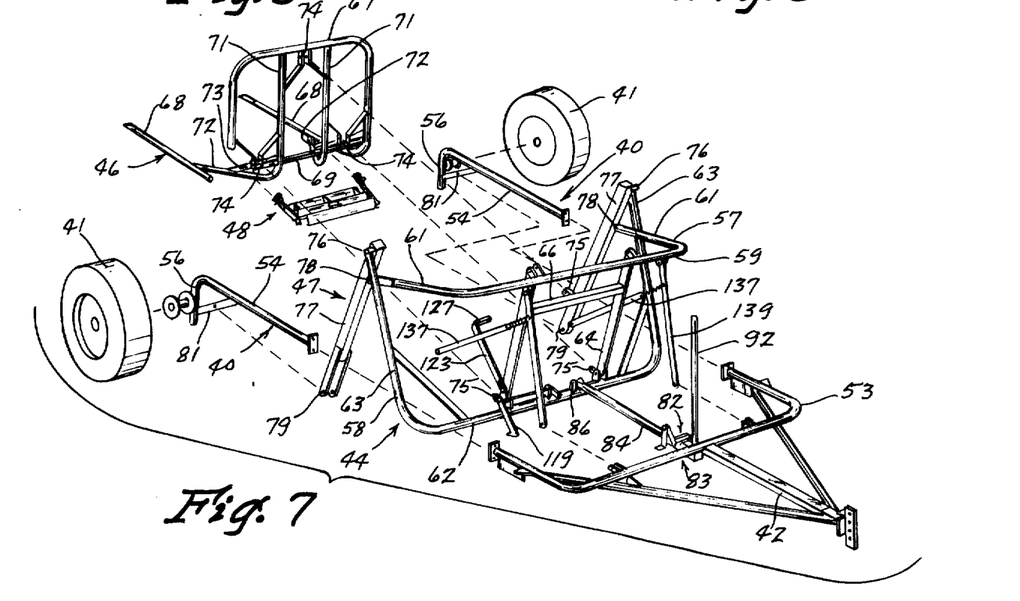
FIG. 7 is an exploded perspective view of the bale handling apparatus of this invention.
Figure 8:
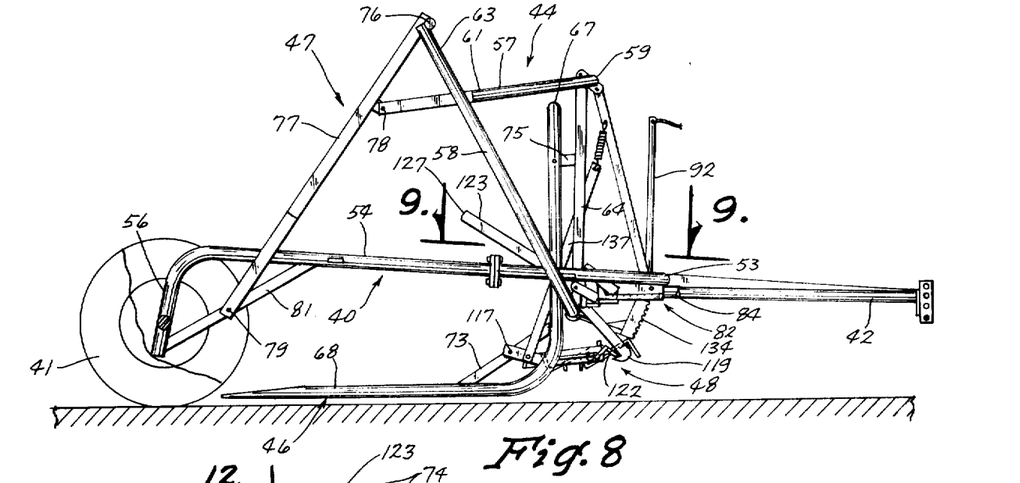
FIG. 8 is a side elevational view of the apparatus showing the parts thereof in their relative positions of FIG. 1 to load a bale on the fork unit.

The carriage or lift frame assembly 44 is comprised of a pair of U-shape frame members 57 and 58. The frame member 57 is generally horizontal and has a forward transverse base section 59 and rearwardly extended leg sections 61. The frame member 58 is generally upright with a base section 62 extended transversely below the portable frame 40 and leg sections 63 projected upwardly and outwardly from opposite sides of the portable frame 40 for termination above and outwardly from the leg sections 61 of the horizontal frame 57. An H-frame 64 having a cross brace 66 pivotally interconnects the base sections 59 and 62 of the frame members 57 and 58, respectively.

The hay buck or fork unit 46 is formed with an upright front wall member 67 of an inverted U-shape, the legs of which terminate in rearwardly extended fork members 68. A transverse brace member 69 interconnects the leg sections of the member 67 adjacent their lower ends, and each fork member 68 is braced by a member 71 of an angulate shape that has an upright portion extended between and connected to the transverse brace member 69 and base portion of the front wall member 67 and a lower horizontal portion 72 projected rearwardly and laterally for connection of its rear end with an adjacent fork member 68. A lift brace 73 is connected to the horizontal portion 72 of the member 71 and the transverse brace 69 for a purpose to appear later. The fork unit 46 is attached in a usual three-point connection with the H-frame 64 for support on the lift frame assembly 44 for movement therewith, with the connecting portions on the fork unit, indicated at 74, and the associated connecting portions on the H-frame at 75.

The terminal end of each leg section 63 of the upright frame 58 is pivotally connected at 76 to the upper end of an associated upright lever or lift arm 77 which forms part of the lift lever means 47. The terminal end of each leg section 61 of the horizontal frame member 57 is pivotally connected at 78 to a corresponding upright lever arm 77 at a position spaced below a pivot 76. The horizontal frame member 57 and upright frame member 58 are thus pivotally interconnected at their forward ends by the H-frame 64 and pivotally connected at their rear ends on the lever arms 77 to provide for a relative scissors action motion of their respective leg sections 61 and 63.

Each lever or lift arm 77 has its lower end pivotally supported at 79 on an upwardly and forwardly inclined mounting member 81 which is secured to the rear end of a leg 54 of the portable frame 40 in a manner to locate the pivot 79 forwardly of and adjacent to the axis of a ground wheel 41. The lift levers 77 comprise the lift lever means 47 which coacts with the ground engaging lever structure 48 to raise the fork unit 46 from its lowered bale loading position to the transport position therefor in response to a forward advance of the tractor vehicle 43.

Figures 9, 10, 11:
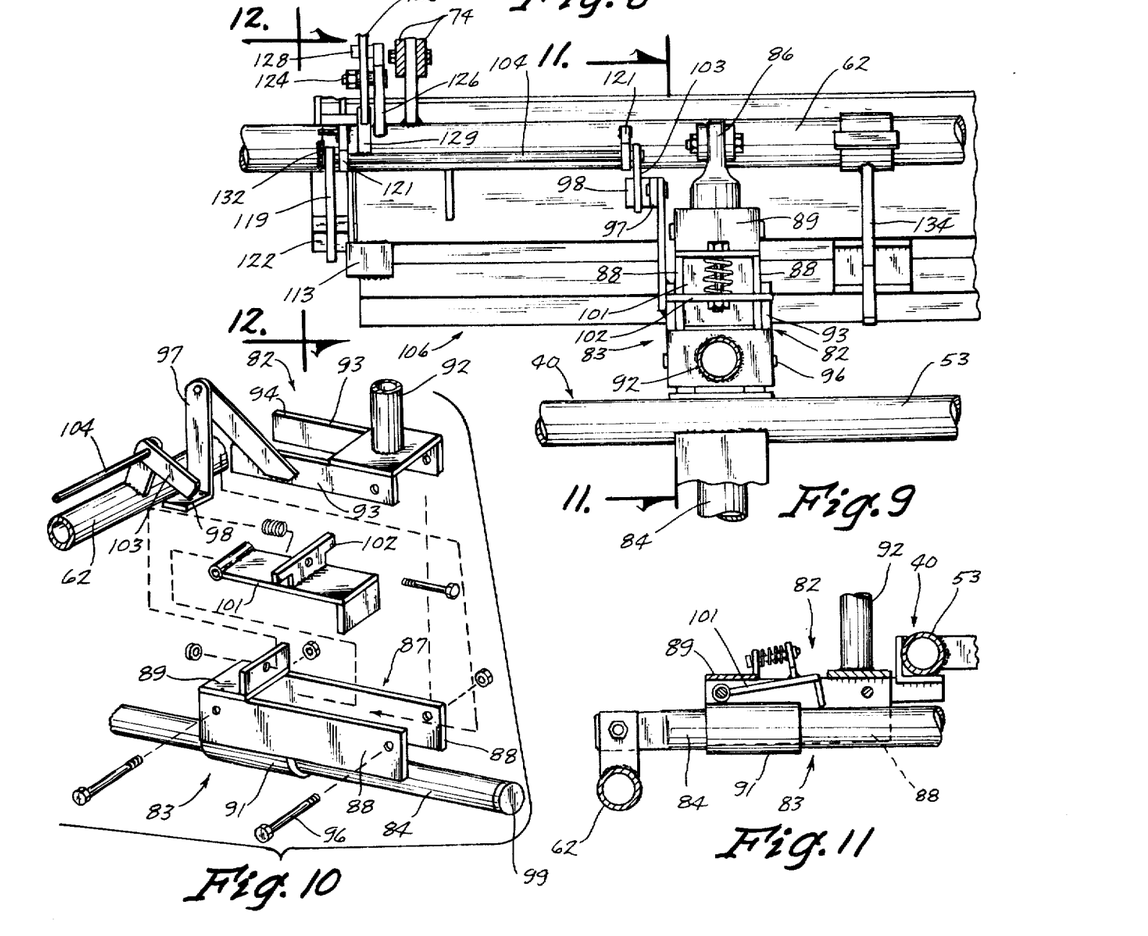
FIG. 9 is an enlarged top plan view taken substantially along the line 9—9 in FIG. 8, showing a manually actuated locking means for holding the lift frame assembly in transport position and its relative assembly with a portion of the leverage lift means.
FIG. 10 is an exploded perspective view of the manually actuated lock means shown in FIG. 9.
FIG. 11 is a detail sectional view taken along the line 11—11 in FIG. 9 showing the lock means of FIG. 10 in an unlocking position.
Figures 16, 23, 25, 26, 28:
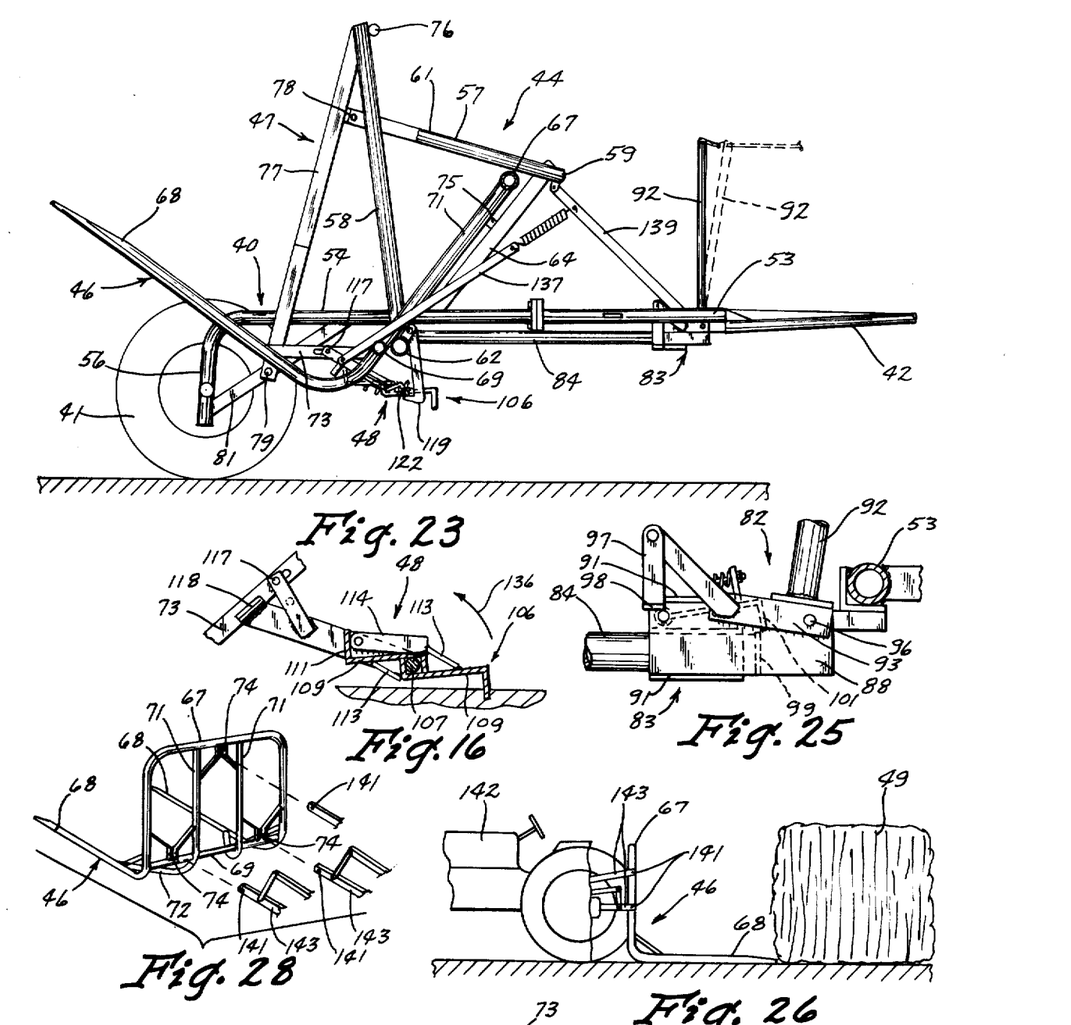
FIG. 16 is a sectional detail view of a supporting lever arm for the rotary foot unit taken generally along the line 16—16 in FIG. 13 and showing the rotary unit locked against rotational movement in one direction at a position corresponding to the position of the rotary foot unit in FIG. 15.
FIG. 23 is a side elevational view of the apparatus illustrated similarly to FIG. 17 showing the fork unit locked in the transport position therefor and the rotary foot unit locked against rotation in a ground clearance relation.
FIG. 25 is a detail view showing the lock means for the lift frame assembly in an actuated position providing for the release of the lift frame assembly to a bale loading position.
FIG. 26 diagrammatically shows the fork unit of the apparatus in a three-point connection with the rear end of a tractor and in a lowered bale loading position.
FIG. 28 is an exploded perspective view diagrammatically illustrating the three point connection of the fork unit with a tractor.

The lift frame assembly 44 is releasably held in an elevated or transport position by coacting locking means 82 carried on the portable frame 40 and upright frame 58 of the lift frame 44 (FIGS. 23 and 25). The locking means 82 includes a lock unit 83 mounted on the forward base section 53 of the portable frame 40 for coacting engagement with a guide rod 84 extended longitudinally of the portable frame 40 with its rear end pivotally connected at 86 to the base member 62 of the upright frame 58 (FIGS. 7 and 11).

Figures 12, 13, 14, 15, 17, 18, 21, 22, 24:
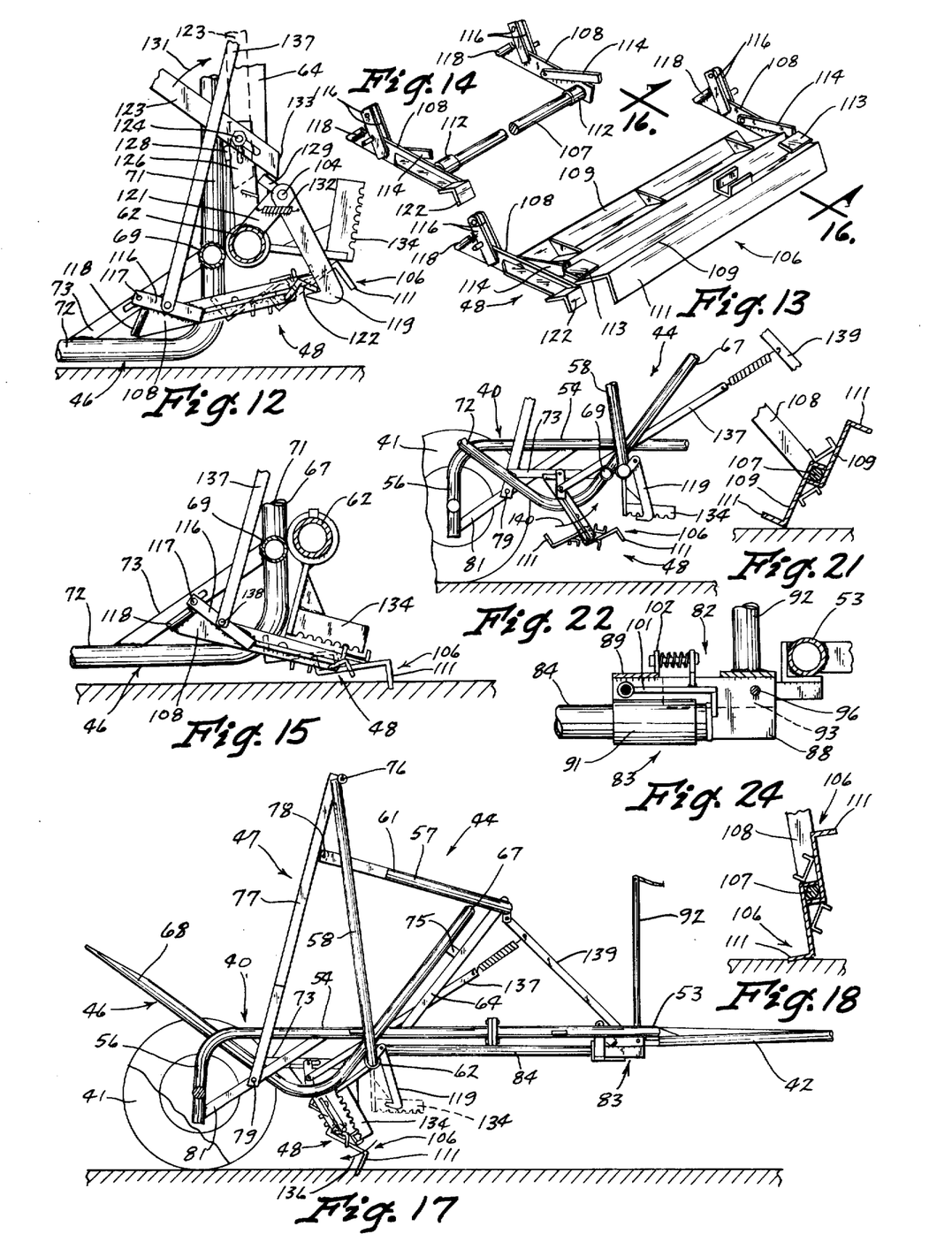
FIG. 12 is a detail sectional view as seen along the line 12—12 in FIG. 9 showing the ground engaging leverage structure of the leverage lift system releasably held out of ground engagement.
FIG. 13 is a perspective view of a rotary foot unit which forms part of the ground engaging leverage structure of the leverage lift system.
FIG. 14 is a foreshortened perspective view of a shaft and lever arm assembly which is embodied in the rotary foot unit of FIG. 13.
FIG. 15 illustrates the ground engaging leverage structure in the initial ground engaging position therefor providing for the elevation of the fork unit to the transport position therefor in response to a forward advance of the apparatus.
FIG. 17 is a side elevational view of the apparatus of this invention showing the rotary foot unit in an advanced rotated position relative to its showing in FIG. 15 and wherein the pressure foot shown in FIG. 15 is removed from engagement with the rotary foot.
FIG. 18 is a diagrammatic showing of the rotary foot unit in a position advanced substantially ninety degrees from its showing in FIG. 15.
FIG. 21 is a diagrammatic showing of the rotary foot unit in a position corresponding to the position of its associated supporting lever arm in FIG. 20.
FIG. 22 is a detail sectional view of the ground engaging lever structure in FIG. 17 showing the position of the rotary foot unit as the fork unit approaches the elevated transport position therefor.
FIG. 24 is a detail sectional view illustrated similarly to FIG. 11 showing the manually actuated lock means for the lift frame assembly in a locked position.

The lock unit 83 (FIGS. 9, 10 and 11) includes a mounting bracket 87 comprised of a pair of upright side plates 88 extended longitudinally of and along opposite sides of the guide rod 84. The front upper sides of the plate members 88 are connected together by a cross member 89 and their lower sides are interconnected by a tubular guide sleeve 91 which slidably receives the guide or lock rod 84. The rear ends of the side plates 88 are rigidly secured in any suitable manner to the base 53 of the portable frame 40. It is seen, therefore, that on a relative movement between the portable frame 40 and the lift frame assembly 44, the lock unit 83 is movable longitudinally of the guide rod 84. When the lock unit 83 is at the free or forward end of the guide rod 84, as shown in FIG. 24, the fork unit 46 is in the transport position therefor. When the portable frame 40 and lift frame assembly 44 are relatively moved so as to locate the lock unit 83 adjacent the pivoted rear end of the guide rod 84, the fork unit 46 is in the loading position therefor, shown in FIG. 8.

To release the fork unit 46 from its transport position, the lock unit 83 includes an upright manually actuated lever 92 (FIGS. 9, 10 and 11) adapted to be manipulated from the towing vehicle 43. The lever 92 is secured to a pivoted bracket 93 having side members 94 arranged to the outside of corresponding side plates 88 of the mounting bracket 87. The forward ends of the side plates 88 and members 94 are pivotally connected by a transverse pivot pin 96 whereby the rear portion of the pivoted bracket 93 is movable up and down relative to the mounting bracket 87 in response to a fore and aft actuation of the lever 92. One side of the bracket 93 carries a depending hook 97 having a laterally outwardly extended portion 98 for a purpose to appear later.

Pivotally mounted at the rear end of the mounting bracket 87 (FIGS. 24 and 25 for up and down pivotal movement into and out of engagement with the forward face 99 of the guide rod 84 is a spring actuated hook or latch 101. The latch 101 has an upright saddle member 102 on its top side projected upwardly from the bracket 87 rearwardly of the lever 92 with the opposite ends thereof resting on the top sides of the members 94 of the pivoted bracket 93. Thus, in response to an actuation of the lever 92 in a forward direction, the saddle member 102 is engaged and moved by the pivoted bracket 93 to disengage the latch 101 from the end face 99 of the guide rod 84, as illustrated in FIG. 25. In its disengaged position, the latch 101, as shown in FIG. 11, is ridable on the guide rod 84 to permit a free sliding movement of the guide sleeve 91 on the guide rod. This sliding movement takes place as the lift frame assembly 44 and fork unit 46 are moved to lowered positions therefor, locates the base section 62 of the upright frame 58 adjacent to and parallel to the base section 53 of the portable frame 40 (FIGS. 8 and 9). In this relative position of the lift frame assembly 44 and portable frame 40, it is to be noted that the hook portion 98 of the hook 97 on the pivoted bracket 93 is located below a rock arm 103 which is mounted on a trip shaft 104 for a purpose to be described later.

The movement of the fork unit 46 to its lowered bale loading position is effected by the action of gravity. The elevating of the fork unit 46 to its transport position is accomplished by the lift lever system 47 in response to a forward advance of the towing vehicle 43.

The ground engaging lever structure 48 of the lift lever system 47 is of an articulated construction and includes a rotatable foot unit 106 (FIGS. 13 and 14) which is rotatably supported on a shaft 107 that is secured to a pair of lever or supporting arms 108. The foot unit 106 is symmetrically formed relative to the axis of the shaft 107 and includes a pair of opposite tread sections 109, each of which has a longitudinally extended side cleat 111 adapted to be pressed into the ground for firm engagement therewith. Collars 112 at the ends of the shaft 107 maintain the tread sections 109 in a spaced operating relation with the supporting arms 108. Each tread section 109 is provided with a pair of longitudinally opposite end stops or pads 113 each of which projects outwardly within the space provided by a spacer collar 112.

A pivoted dog 114 is pivotally mounted on a supporting arm 108 along the inner side thereof for swinging movement of its free end into engagement with a corresponding stop pad 113 to hold the rotary foot unit 106 against rotation in one direction for a purpose to appear later. The end of each supporting arm 108, remote from the shaft 107, carries a pair of transversely spaced laterally projected ears 116 that are arranged to opposite sides of a corresponding lift brace 73 (FIG. 12) for pivotal connection therewith in a lost motion connection 117. Each supporting arm 108 terminates in a grooved end face 118 adapted for abutting engagement with an associated lift brace 73 to limit pivotal movement of the supporting arm in one direction relative to the lift brace.

The foot unit 106 is releasably held in a ground clearance relation by a hook 119 (FIGS. 9 and 12) rigidly mounted on the trip shaft 104 which extends longitudinally of the base section 62 of the upright frame 58 and is rotatably carried in a pair of journal members 121 secured to the base section 62. The hook 119 is engageable with a catch 122 secured to one of the supporting arms 108 (FIGS. 12 and 13) and is automatically moved by a push bar 123 out of engagement with the catch 122 when a bale 49 has been fully loaded on the fork unit 46 to a position against the front wall member 67. The push bar 123 (FIGS. 7, 9 and 12) has its forward end pivotally supported in a lost motion connection 124 on an upright mounting arm 126 carried on the base section 62 of the upright frame 58. The push bar 123 extends through the front wall member 67 of the fork unit 46 so that the rear end of the push bar is pivotally movable up and down at a position rearwardly of the wall member 67.

A push plate 127 at the rear end of the push bar 123 is engageable by the front side of a bale 49 being loaded onto the fork unit 46 (FIG. 1). When the fork unit is empty the push bar is held in an upwardly and rearwardly inclined position by a stop member 128 on the mounting arm 126 (FIGS. 9 and 12). In this inclined or normal position, the forward end of the push bar 123 (FIGS. 9 and 12) is arranged to engage a trip pin 129 on the shaft 104 on a pivotal upward and forward movement of the rear end of the push bar. This pivotal movement occurs when the push plate 127 is engaged and moved forwardly by a bale 49 being loaded on the fork unit 46.

Thus, concurrently with the loading of a bale 49 on the fork unit, to a position adjacent the front wall member 67, the push bar 123 (FIG. 12) is concurrently pivoted in a clockwise direction relative to the pivot connection 124 as indicated by the arrow 131, into engagement with the trip pin 129 to release hook 119 from engagement with the catch 122 against the action of a holding spring 132. The ground engaging lever structure 48 is thus released for engagement of the forward one of the cleats 111 into ground engagement. On the actuation of the hook 119, the forward end of the push bar 123 is moved to its dotted line position shown in FIG. 12 located to the rear side of the trip pin 129, it being understood that the holding spring 132 returns the hook 119 and trip pin 129 to their full line positions shown in FIG. 12. When a bale 49 is removed from the fork unit 46 the push bar 123 is free to pivot downwardly and rearwardly about the pivot 124 under the action of gravity to its full line position in FIG. 12. This movement is provided by the coaction of the lost motion connection 124 and the inclined end face 133 which permits the push bar 123 to clear the trip pin 129 and recock itself for later actuation of the hook 119.

The actuation of the hook 119 to release the ground engaging lever structure 48 into ground engagement takes place when the fork unit 46 is in a bale loading position and a bale 49 has been loaded thereon to a position against the front wall member 67 of the fork unit. With the fork unit 46 loaded and the ground engaging lever structure 48 released, the apparatus is now operated to elevate the fork unit to its transport position. Concurrently with the ground engagement of the structure 48 there is released a pressure foot 134, which is pivotally mounted on the base section 62 of the upright frame 57 and normally supported in resting engagement on the rotary foot unit 106. The pressure foot 134 applies an initial downward force on the foot unit 106 to prevent slippage thereof across the surface of the ground. In the initial ground engaged position of the foot unit 106, and as shown in FIG. 16, the unit 106 is locked agaisnt a rearward rotational direction, as indicated by the arrow 136, by the engagement of the dogs 114 on the supporting arms 108, with the stop pads 113 on the foot unit 106. The foot unit 106 and supporting arms 108, on an advance movement of the towing vehicle 43, thus function as rigid lower structure relative to the pivot connection 117. On an initial advance of the portable frame 40 and resultant movement of the ground engaging lever structure 48 to its position shown in FIG. 17, the pressure foot 134 moves out of engagement with the rotary foot unit 106 to a position pivotally suspended from the base section 62 of the upright frame 58.

As the ground engaging structure approaches a position (FIGS. 18 and 19) advanced about ninety degrees relative to the front cleat fulcrum 111, the dogs 114 continue their function of locking the foot 106 against rotation in the direction indicated by the arrow 136. Concurrently with this 90° advance of the ground engaging structure 48 relative to the front cleat 109, the supporting arms 108 are moved in a lost motion relation at the connections 117 relative to an associated lift brace 73 until an arm end face 118 is moved into bearing engagement with a lift brace 73. When this occurs the leverage action of the ground engaging structure 48 against the ground surface at the front cleat 111 as effected by the forward advance of the towing vehicle, applies a lifting action on the lift braces 73 which acts to restrain the fork unit 46 and in turn the lift frame assembly 44 against movement.

This restraining action and the continued forward advance of the portable frame 40 triggers the actuation of the lift levers 47. With the lower ends of the lift levers 77 being moved forwardly concurrently with the restraining action against a forward movement of their upper ends by the lift frame assembly 44, an upward lifting force is applied by the lift levers on the upright frame 57 providing for the elevation of the lift frame assembly 44 and, in turn, of the fork unit 46 to their respective transport positions. During the elevated movement of the lift frame assembly 44 relative to the portable frame 40, the lock unit 83 is moved forwardly on the guide rod 84 to provide for the engagement of the latch 101 with the end face 99 of the guide rod.

The fork unit 46 is elevated to its transport position at about the time the ground engaging structure 48 has advanced to its position shown in FIGS. 20 and 21, which for convenience will be called an 'over center position' for the dogs 114. At this over center position, the dogs 114 are moved out of the engagement with the stop pads 113 to permit forward rotational movement of the rotary foot unit 106. Concurrently with the forward rotation of the foot unit 106, the supporting arms 108 are pulled out of an abutting engagement with the lift braces 73 by the action of a pair of tension rods 137 corresponding to the supporting arms 108. The tension rods 137 in response to the elevation of the fork unit 46 rotate the supporting arms 108 upwardly and forwardly about the lost motion connections 117, as indicated by the arrow 140 in FIG. 22. At this time, as shown in FIGS. 12 and 22, the rotary foot unit 106 is in a position rotated about one hundred eighty degrees from its initial ground engaging position. In this advanced position the rotary unit 106 is moved by the tension rods 137 into engagement with the hook member 119. The tension rods 137 are pivotally connected at their rear ends to pivot pins 138 provided on the lever arms 108. The forward ends of the tension rods 137 are connected to a pair of corresponding stabilizer links 139 (FIGS. 7, 8 and 23) which pivotally interconnect the base sections 53 and 59 of the portable frame 40 and horizontal frame 57 respectively.

To unload the bale 49, the manual actuating lever 92 is moved from its full line position shown in FIGS. 3 and 23, to the dotted line position therefor illustrated in the same figures, thereby releasing the fork unit 46 for gravity movement to its lowered position of FIGS. 4 and 8. After the bale 49 has been unloaded, as previously described in connection with FIG. 5, the fork unit 46 remains in the lowered position with the push bar 123 projected rearwardly from the front wall member 67 of the fork unit in its rest or normal position. Since the unloaded fork unit 46 is to elevated to its transport position for return to the field to pick up another bale, the push bar 124 is ineffective to actuate the hook 119 for release of the ground engaging lever structure 48 into ground engagment.

For this purpose, reference is made to FIGS. 9 and 10 wherein, as previously noted, the lateral portion 98 of the depending hook 97 is located below a rock arm 103 mounted on the trip shaft 104 when the fork unit 46 is in its lowered position. Thus on actuation of the manual lever 92 in a forward direction the bracket 93 is pivoted upwardly and forwardly relative to the pivot 96 whereby the rock arm 103 is engaged to rotate the trip shaft 104 in a counter-clockwise direction, as viewed in FIG. 12, to move the hook 119 to release the ground engaging lever structure 48. With the structure 48 released into ground engagment (FIG. 15) the empty fork unit 46 is elevated to its transport position in all respects the same as if it were carrying a bale 49.

Figure 27:
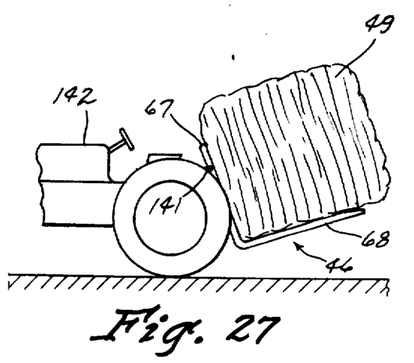
FIG. 27 is illustrated similarly to FIG. 26 and shows the fork unit in an elevated transport position.

The fork unit 46, as described hereinabove, is secured in a usual three point connection 74 and 75 with the H-frame 64. As a result the fork unit or hay buck can be assembled directly to the three point hitch 141 of a tractor 142, as diagrammatically illustrated in FIGS. 26, 27 and 28. A bale 49 is loaded on the fork unit when lift arms 143 of the hitch 141 are in lowered positions and the tractor reversed to move the fork members 68 under the bale. The lift arms 143 are then elevated to raise the fork unit to its transport position (FIG. 27). To unload the bale 49, the fork unit 46 is lowered and the tractor 142 advanced.

Although the invention has been described with respect to a preferred embodiment thereof it is to be understood that it is not to be so limited since changes and modifications can be made therein which are within the full intended scope of this invention as defined by the appended claims.

I claim:

1. A bale handling machine comprising:
   a. a portable frame,
   b. a bale receiving unit having fork members,
   c. means movably supporting said bale receiving unit on the portable frame for movement from a ground lowered bale loading position, wherein said fork members are extended horizontally rearwardly, to an elevated bale transport position, wherein the fork members are projected upwardly and rearwardly,
   d. holding means on said portable frame releasably interlocked with said bale receiving unit supporting means to hold said bale receiving unit in the transport position therefor,
   e. manually actuated means on said portable frame for operating said releasable holding means to release said bale receiving unit supporting means for movement to a bale loading position for said bale receiving unit,
   f. said portable frame, when the bale receiving unit is in the loading position therefor, being movable rearwardly relative to a ground supported bale to load the bale on the receiving unit, and
   g. means responsive to a forward advance of the portable frame, including a ground engageable lever means movably supported on the bale receiving unit and a lift lever means interconnecting said portable frame and bale receiving unit supporting means, for elevating the bale receiving unit to the transport position therefor.

2. The bale handling machine according to claim 1, including:
   a. means on said bale receiving unit supporting means for releasably locking said ground engageable lever means out of ground engagement, and
   b. means on said bale receiving unit responsive to the reception of a bale into said bale receiving unit to automatically actuate said locking means to release said ground engageable lever means into ground engagement.

3. The bale handling apparatus according to claim 1 wherein:
   a. said ground engageable lever means includes a pair of transversely spaced downwardly and forwardly extended supporting arms,
   b. lost motion means connecting the upper ends of said supporting arms with said bale receiving unit,
   c. a rotatable ground engaging foot member extended between and rotatably supported on the lower ends of said supporting arms, and
   d. means on said supporting arms for holding said foot member against upward and rearward rotation during advance of the portable frame to elevate said bale receiving unit.

4. The bale handling apparatus according to claim 3 including:
   a. a pressure applying lever carried on said bale receiving unit supporting means engageable with said rotatable foot member, on initial release of the foot member into ground engagement, to hold the foot member in ground engagement unitl said supporting arms are without lost motion relative to said bale receiving unit.

5. A bale handling machine comprising:
   a. a portable frame connectable to a vehicle,
   b. a fork unit,
   c. a frame assembly for supporting said fork unit,
   d. means movably mounting said frame assembly on the portable frame for movement of the fork unit from a lowered ground loading position to an elevated transport position, said portable frame, when the fork unit is in the lowered position therefor, being moved rearwardly relative to a ground supported bale to load a bale on the fork unit,
   e. manually actuated means on the portable frame for releasably holding the frame assembly in a transport position for the fork unit,
   f. means for moving said frame assembly from the loading position of the fork unit to the transport position therefor in response to a forward advance of said portable frame including a lift lever means and a ground engaging lever means,
   g. means movably interconnecting said lift lever means with said portable frame and frame assembly,
   h. means movably supporting said ground engaging lever means on said fork unit for movement into and out of ground engagment,
   i. means on said frame assembly for releasably holding said ground engaging lever means out of ground engagement, when the fork unit is in the transport position therefor, and actuated to drop said ground engaging lever means into ground engagment when a bale is located on said fork unit, and
   j. means coacting with said releasable holding means to automatically move said holding means into holding engagement with said ground engaging lever means concurrently with the elevation of the fork unit to the transport position therefor.

6. The bale handling machine according to claim 5, wherein:
   a. said fork unit includes fork members which in the lowered position of the fork unit extend rearwardly and horizontally, and in the transport position extend rearwardly and upwardly.

7. The bale handling machine according to claim 5 wherein:
   a. said means for releasably holding the ground engaging lever means includes a trip shaft rotatably mounted on said frame assembly, and a hook member on said trip shaft engageable with said ground engaging lever means, when the fork unit is in the lowered position therefor, and
   b. means for rotating said shaft, in response to the bale on said fork unit, to disengage said hook to release the ground engaging lever means into ground engagement,
   c. said lift lever means and ground engaging lever means coacting, in response to a forward advance of the portable frame, to move the frame assembly from a bale loading position for the fork unit to the bale transport position therefor.

8. The bale handling machine according to claim 7 wherein:
   a. said frame assembly includes an upright U-shape frame member having a base section extended transversely of and below said portable frame and upwardly projected leg sections located outwardly from opposite sides of the portable frame, and a substantially horizontal U-shape frame member located above said portable frame having a forward transverse base section and rearwardly projected leg sections,
b. link means pivotally interconnecting the base sections of said upright frame member and horizontal frame member,
c. said lift lever means including a pair of transversely spaced upright lever members having the lower ends thereof pivoted on said portable frame adjacent the rear end thereof for pivotal movement longitudinally of the frame,
d. first transverse pivot means pivotally connecting the rear ends of the leg sections of said upright frame member to the upper ends of said pair of lever members, and
e. second transverse pivot means pivotally connecting the rear ends of the leg sections of said horizontal frame member to said pair of lever members at positions spaced downwardly from said first pivot means.

9. The bale handling machine according to claim 8, wherein:
a. said portable frame includes a forwardly extended tongue structure and a pair of transversely spaced side members each of which has a rear terminal end section, and
b. a ground wheel rotatably mounted on each one of said rear end sections.

* * * * *